United States Patent [19]

Colin

[11] Patent Number: 5,636,808
[45] Date of Patent: Jun. 10, 1997

[54] REEL AND SUPPORT FRAME BEARING ASSEMBLY

[75] Inventor: George M. Colin, San Clemente, Calif.

[73] Assignee: Tri-Star Plastics Incorporated, Anaheim, Calif.

[21] Appl. No.: 440,892

[22] Filed: May 15, 1995

[51] Int. Cl.⁶ .................................................. B65H 75/30
[52] U.S. Cl. .................. 242/395; 242/406; 242/546.1; 242/599.3; 384/455; 384/574
[58] Field of Search .................. 242/395, 395.1, 242/546.1, 599.3, 406; 384/455, 574, 618; 4/498, 502

[56] References Cited

U.S. PATENT DOCUMENTS

| | | | |
|---|---|---|---|
| 3,117,740 | 1/1964 | Rose | 242/599.3 |
| 3,930,621 | 1/1976 | Wood | 242/546.1 X |
| 4,003,609 | 1/1977 | Juhas | 384/574 |
| 4,124,256 | 11/1978 | de Senneville | 384/455 |
| 4,328,930 | 5/1982 | Kalendovsky | 4/498 X |
| 4,407,027 | 10/1983 | Colon, Jr. | 242/395 X |

FOREIGN PATENT DOCUMENTS

| | | | |
|---|---|---|---|
| 8 000 619 | 1/1963 | Japan | 242/599.3 |
| 1 190 894 | 5/1970 | United Kingdom | 242/395 |

OTHER PUBLICATIONS

Bloxham, Improved Reel Arbor Lock, Jul. 1972, p. 1.

Primary Examiner—Daniel P. Stodola
Assistant Examiner—William A. Rivera
Attorney, Agent, or Firm—Roth & Goldman

[57] ABSTRACT

A reel bearing assembly for supporting a reel in a support frame, the frame having a circular bearing opening having an axially extending cylindrical surface and radially inwardly extending flange and the assembly also including a specially shaped end cap for the reel which, with the configuration of the opening and flange in the support frame, defines a cavity which both radially and axially confines a bearing cage, the end cap having one or more retaining members which engage the flange on the support frame to hold the assembly together.

20 Claims, 4 Drawing Sheets

REEL AND SUPPORT FRAME BEARING ASSEMBLY

CROSS REFERENCE TO RELATED APPLICATIONS, IF ANY

None

BACKGROUND OF THE INVENTION AND PRIOR ART

The present invention was developed for specific use as a bearing assembly used in a pair of spaced frame members which support a swimming pool cover reel but, in its broadest aspects, the invention is useful in a variety of applications, particularly wherever exposure to any metal corrosive or other harsh environment takes place, and in which an economically reproducible and easily assembled bearing with a minimum of parts is required.

One example of a prior art reel bearing, used in a swimming pool cover reel is disclosed in U.S. Pat. 4,407,027 issued October 4, 1983 to Colin which uses an elongated pool cover reel supportable between first and second end frames which are each of a generally triangular configuration and in which separate bearing sleeves are affixed to the ends of the pool cover reel and passed through apertures in the frame members to provide a suitable bearing surface therein. Rotatable hand wheels at either end of the assembly are affixed to the bearing sleeves and to stub shafts on the ends of the cover support tube by set screws located outside the frame supports. As shown in the patent, the bearing sleeve rotates directly inside of the apertures in the frame supports. In more recent commercial embodiments, separate cages with roller bearings therein have been interposed between the bearing sleeves and the inside of the frame apertures to provide a more smooth rolling bearing.

Triangular support frames for such reels have been used in combination with casters, mounted on a first side of the triangle, to provide a reel that is easily moved when said first side is disposed adjacent a surface upon which the support rests. The triangular support frame can be rotated so that a second side of the triangular frame, which does not have casters, rests upon the surface, providing a stable and relatively fixed support for the reel. A triangular shape is advantageous for this and other reasons, including the inherent strength arising from the shape, making support frames of plastic for example possible, and prior bearings have been used in conjunction with such triangular support frames.

It is the object of the present invention to improve upon the prior art by eliminating parts, or, in other ways, reducing the manufacturing costs in producing the reel bearing assembly in reel support frames by reducing materials costs and in reducing the labor involved in assembling the bearing assembly.

SUMMARY OF THE INVENTION

The present invention accordingly provides, in combination, a support frame member and a rotatable member supported by the frame, said frame member having a circular opening therein and a radially inwardly extending flange on said frame member, said flange having a bearing confining face, and a bearing assembly positioned in said frame opening, said bearing assembly comprising:

a) an end cap having an inside face and outside face, said end cap including a radially extending lever affixed thereto and a cup extending in an inward direction from said inside face and adapted to receive and surround one end of said rotatable member;

b) a bearing cage surrounding an outer arcuate surface of said cup and axially confined by said radially inwardly extending flange on said frame member and said inside face of said end cap; and c) a fastening device securing said end cap to said rotatable member, and a retaining member attached to said cup adapted to engage a face of said flange opposite said bearing confining face.

BRIEF DESCRIPTION OF THE DRAWINGS

FIG. 5 is a right side elevation view of an end cap and connected crank knob forming a handwheel for rolling up a pool cover.

DESCRIPTION OF THE PREFERRED EMBODIMENT

Figure 1:
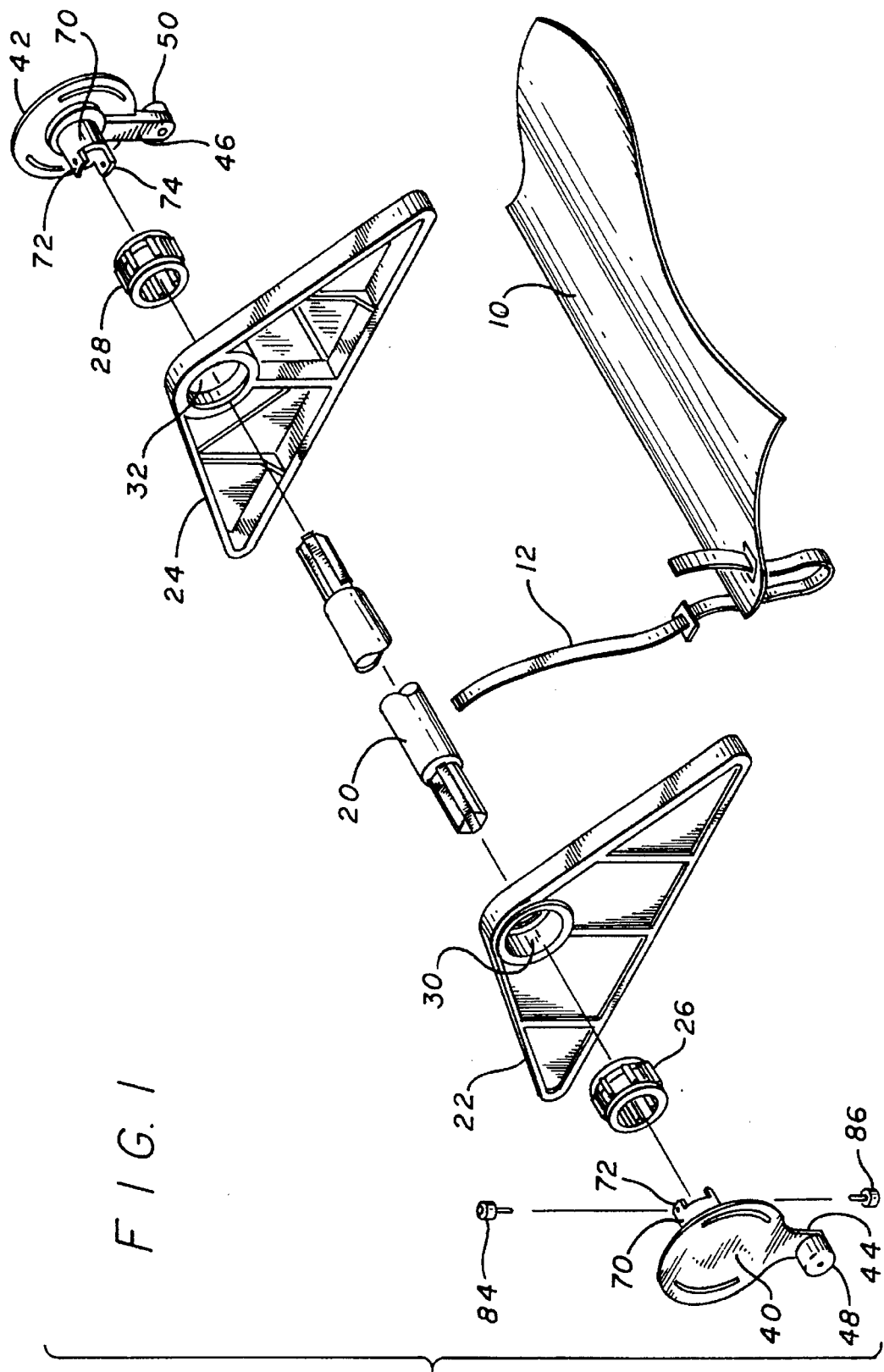
FIG. 1 is a exploded perspective view of a swimming pool cover reel system incorporating the present invention.

As seen in FIG. 1, a flexible swimming pool cover 10 which is deployed over the surface of a swimming pool is attached by straps 12 or otherwise to a rotatable pool cover support tube 20. A pair support frames 22, 24 of generally triangular configuration are provided at either end of the cover support tube 20 for receiving bearing cages 26, 28 with each support frame having a circular bearing opening 30, 32 therein which receives a bearing cage. End caps 40, 42 each provided with radially extending levers 44, 46 and crank knobs 48, 50 are attached to the opposite ends of the cover support tube 20 so that the pool cover 10 can be reeled onto the tube 20 from either end thereof.

Figure 2:
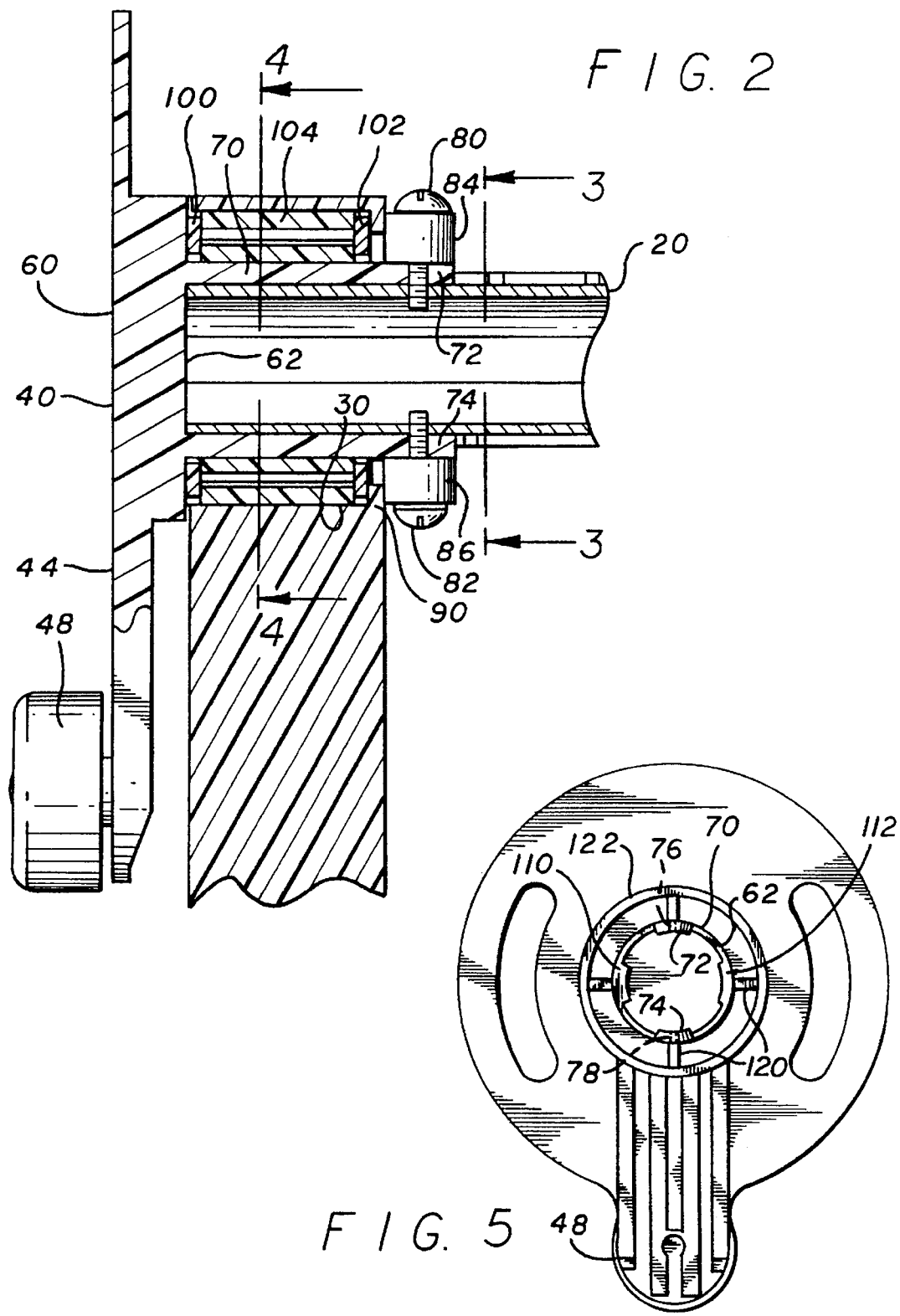
FIG. 2 is a cross sectional elevation view of a preferred embodiment of a frame and reel bearing assembly used with the pool cover reel system of FIG. 1.
Figure 3:
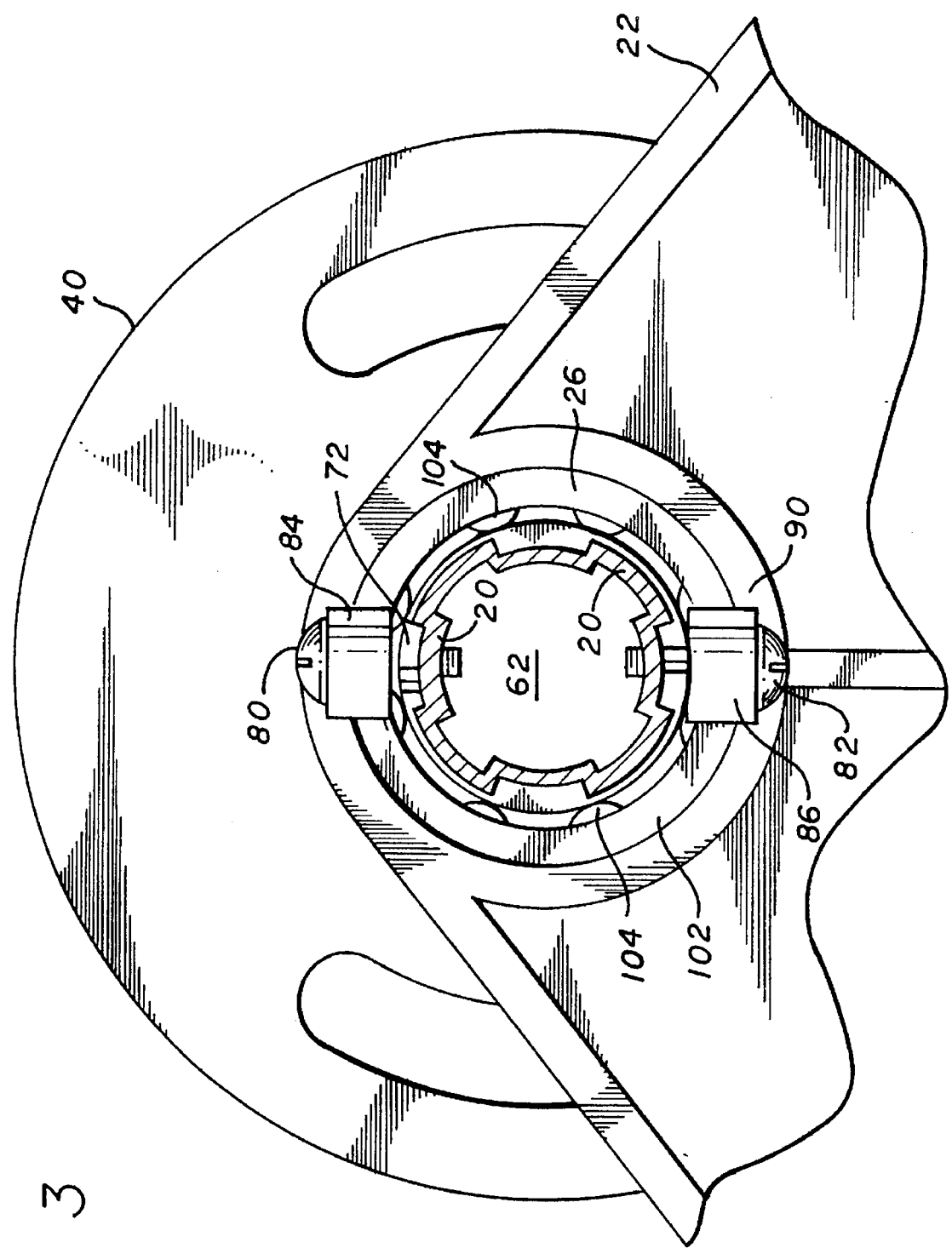
FIG. 3 is an end cross sectional elevation view taken at lines 3—3 on FIG. 2.

Turning now to FIGS. 2 and 5, at least one and preferably both of the end caps 40, 42 each comprise a generally disc shaped member rotatable about the axis of rotation of the cover support tube 20. Each end cap has an outside face 60 and an inside face 62 from which a generally cylindrical cup 70 extends in an inward direction towards the associated support frame and end of the pool cover support tube 20. The end cups 70 each have one or more axially extending lug members 72, 74 thereon which are equally circumferentially spaced from each other. Each lug also is thickened in the radial direction as compared with the wall thickness of the cup extending radially inward to form keys or splines so that the lugs can form a positive rotational interlock with axially extending keyways or slots in the associated end of the tube 20. Two lugs are shown on each cup as best seen in FIGS. 3 and 5 but a single lug will perform the intended purpose if necessary. Each lug 72, 74 has a radially extending aperture 76, 78 therethrough for receiving the threaded end of fasteners 80, 82 for attachment of the end cap 40 to the end of the pool cover support tube, the fasteners also attaching retaining rollers 84, 86 and with the rollers acting as retaining members which retain the end caps 40, 42 in the support frames 22, 24. The fasteners are preferably headed screws with a threadless shank extending axially from under the head, the axial length of the shank being greater than the axial length of retaining rollers 84, 86 which are mounted on the screws as seen in FIGS. 2 and 3.

At least one of the support flames 22, 24 has an integrally formed radially inwardly extending flange 90 thereon which provides a dual function of axially confining a bearing cage 26 and of providing a bearing surface for engagement with the peripheral surfaces of the retaining rollers 84, 86 of the retaining members which affix the end cap 40 to the associated support frame member 22.

A bearing cavity is defined by the circular opening 30 in the support frame member, the exterior cylindrical surface of the cup 70, the inside face 62 of the end cap and one of two opposed faces of the flange 90.

Figure 4:
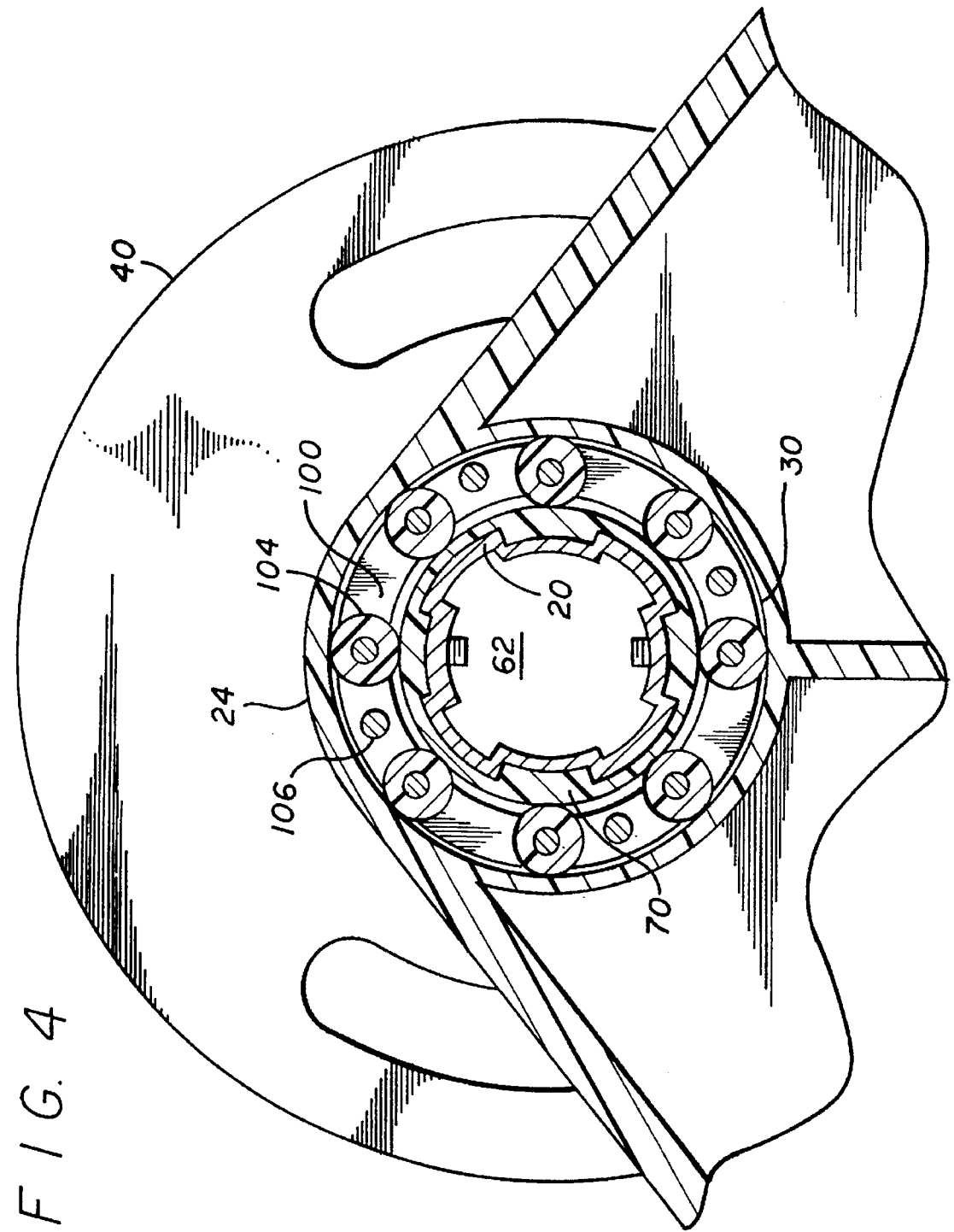
FIG. 4 is a cross sectional elevation view taken at lines 4—4 on FIG. 2.

Confined within the cavity is a roller bearing cage 26 comprised of a pair of spaced end rings 100, 102 having a plurality of needle rollers 104 extending therebetween and rotatably supported in the end rings and a plurality of intermediate spacer rods 106 (FIG. 4) extending between the end rings 100, 102. The bearing cage 26 is preferably made of lubricous plastic materials such as those known under the trademark Teflon. It will thus be seen that the needle rollers 104 provide smooth rolling contact between the exterior cylindrical surface of the cup 70 and the interior cylindrical surface of the support frame opening 30 whereas the end rings 100, 102 of the bearing cage ride smoothly against and are axially confined by the inside face 62 of the cap and the facing face of the flange 90.

The pool cover support tube 20 is preferably made of aluminum and may have axially extending keyways or slots (unnumbered) formed by deforming the tube at the ends thereof for reception of the radially inwardly projecting lug members 72, 74 and additional radially inwardly projecting lugs 110, 112 on the inside face of the end cap which assist the fastening screws 80, 82 in preventing relative rotation between the end cap 40 and cover support tube 20. It will be appreciated that axially extending keyways or slots in the tube and radially projecting lugs 110, 112 in the end cap are not essential but constitute preferred features which provide a positive rotational interlock between the cover support tube and end caps.

The device is easily assembled by a lay person who can be given a minimum of instructions since a minimum of parts are employed. The bearing cage 26 simply is slipped onto the exterior surface of the cup 70 and the assembled parts are then inserted into the circular opening 30 in the support frame until the end ring 102 of the bearing cage is seated against the flange 90 to confine axial movement of the bearing cage 26. The pool cover support tube 20 is then inserted into the cup 70 in the end cap from the opposite side of the support frame with rotation of the tube 20 if necessary to align slots, if provided, on the ends of the pool cover support tube with the radially projecting lugs 110, 112 on the inside face of the cap. Pre-bored holes in the ends of the pool cover support tube will then automatically be aligned with the radially extending apertures 76, 78 in the axially extending lug or lugs 72, 74 on the end of the cup. The axial movement retaining roller or rollers 84, 86 of the retaining member are then mounted with the fastening screws 80, 82 on the lugs 72, 74 to non-rotatably affix the end cap 40 to the pool cover support tube 20 with a minimum of assembly steps. Separate bushing sleeves on the ends of the tube 20 as used in prior art assemblies are thus unnecessary in the present invention.

Without limitation, the end caps with integrally formed cups and lugs thereon can be injection molded from hard plastic or plastic composite materials, as can the triangular support frame members. The retaining rollers are preferably molded of softer lubricous plastic such as Teflon as are all components of the needle bearing cage 26.

It will also be appreciated that the end rings of the bearing cage need not contact a bearing surface which extends around the inside face of the cap for a full 360°. As seen in FIG. 5, radially extending webs 120 which extend inwardly from a circular ring 122 on the inside face 62 are preferably molded into the end cap to provide the sole bearing surfaces against which the associated end ring 100 of the bearing cage rotates. This has been found to reduce friction but it will be appreciated that the ring 122 and webs 120 are not essential but only preferred for reducing the amount of plastic required in the end cap molding.

Persons skilled in the art will readily appreciate that various modifications can be made from the preferred embodiment thus the scope of protection is intended to be defined only by the limitations of the appended claims.

I claim:

1. In combination, a support frame and a rotatable member supported by said frame, said frame comprising an axially extending cylindrical surface surrounding a circular opening therein and a radially inwardly extending flange on said frame disposed about said opening, said flange having a bearing confining face and an opposite face, and a bearing assembly positioned in said frame opening, said bearing assembly further comprising:

a) an end cap having an inside face and outside face, and a cup extending in an inward direction from said inside face adapted to receive and surround one end of said rotatable member;

b) a bearing cage surrounding an outer arcuate surface of said cup and axially confined by said radially inwardly extending flange on said frame and said inside face of said end cap;

c) means for securing said end cap to said rotatable member; and d) a retaining member attached to said cup, adapted to engage said face of said flange opposite said bearing confining face.

2. The combination of claim 1, further comprising a lug member extending axially toward said rotatable member from said cup, the lug member having said retaining member disposed thereon.

3. The combination of claim 2, wherein said retaining member comprises a roller.

4. The combination of claim 3, wherein said means for securing said end cap to said rotatable member comprises a headed screw fastener and said headed screw also secures said retaining member to said lug member, said retaining member being rotatably disposed about said screw, the screw and retaining roller together cooperating to hold the frame, rotatable member, end cap, and bearing cage comprising the combination together when the screw and roller are mounted on said lug, said screw extending through said lug and into said rotatable member.

5. The combination of claim 4, wherein said face of said flange opposite said bearing confining face extends radially and said retaining member roller has a radially extending surface which contacts said face of said flange opposite said bearing confining face and the headed screw further comprising a threadless shank portion extending in a radial direction from the lug to the head, the length of said threadless shank portion being greater than the thickness of said retaining member roller, said retaining member roller being rotatably disposed about said threadless shank.

6. The combination of claim 5, wherein said bearing cage comprises a pair of end rings, a plurality of rollers having opposite ends supported by said end rings and a plurality of spacers extending between said end rings, said end rings slidably contacting said inside face of said end cap and said bearing confining face of said flange.

7. The combination of claim 6, further comprising a radially extending lever affixed to said end cap and a crank knob rotatably affixed to said lever member.

8. The combination of claim 6, further comprising a pair of said support frames having said rotatable member suspended therebetween and a flexible swimming pool cover attached to said rotatable member.

9. A reel assembly configured for storing, deploying, and recovering a flexible protective sheet windably received by said reel assembly, said reel assembly comprising a support frame and a rotatable member supported by said frame, said frame having an axially extending cylindrical surface surrounding a circular opening therein and a radially inwardly extending flange on said frame disposed circumferentially adjacent said hole, said flange having a bearing confining face, and a bearing assembly positioned in said frame opening, said bearing assembly further comprising:
   a) an end cap having an inside face and outside face, and a cup extending in an inward direction from said inside face adapted to receive and surround one end of said rotatable member, said end of said rotatable member having a slot therein, said cup having an radially inwardly extending lug which engages said slot in the rotatable member to form a rotational interlock preventing relative rotational movement between said end cap and said rotatable member;
   b) a bearing cage surrounding an outer arcuate surface of said cup and axially confined by said radially inwardly extending flange on said frame and said inside face of said end cap; and
   c) at lest one lug member extending axially toward the rotatable member from said cup, a fastener securing said end cap to said rotatable member, and a retaining member mounted on said lug adapted to engage a face of said radially inwardly extending flange opposite said bearing confining face.

10. The reel assembly of claim 9, further comprising at least two circumferentially equally spaced lug members extending axially toward said rotatable member from said cup, each lug member having a retaining member thereon.

11. The reel assembly of claim 10, wherein said retaining members comprise rollers.

12. The reel assembly of claim 11, wherein each said fastening device comprises a headed screw, said retaining roller being rotatably disposed about said screw and thereby mounted on said lug, said screw extending through said lug and into said rotatable member.

13. The reel assembly of claim 12, wherein the fastening device further comprises a threadless shank extending in a radial direction from said lug towards the head of the screw, the length of said threadless shank being greater than the thickness of said retaining roller, and wherein said face of said flange opposite said bearing confining face extends radially and said retaining member rollers each have radially extending surfaces which contact said radially extending face.

14. The reel assembly of claim 9, wherein said bearing cage comprises a pair of end rings, a plurality of needle rollers having opposite ends supported by said end rings and a plurality of spacers extending between said pair of end rings, said end rings slidably contacting said inside face of said end cap and said bearing confining face of said flange.

15. The reel assembly of claim 14, wherein said support frame has a triangular shape.

16. The reel assembly of claim 15, further comprising a pair of said support frames having said rotatable member suspended therebetween and a flexible swimming pool cover attached to said rotatable member.

17. The reel assembly of claim 14, wherein said inside face of said end cap comprises radially extending webs confining said bearing cage.

18. The reel assembly of claim 14, wherein said bearing cage is formed of lubricous material.

19. A swimming pool cover reel for storing, deploying and recovering a protective pool cover windably received by said reel, said reel having a support frame and a rotatable member supported by said frame, said frame comprising an axially extending cylindrical surface surrounding a circular opening therein and a radially inwardly extending flange on said frame disposed about said opening, said flange having a bearing confining face and an opposite face, and a bearing assembly positioned in said frame opening, said bearing assembly further comprising:
   a) an end cap having an inside face and outside face, said end cap including a radially extending lever affixed thereto and a crank knob rotatably affixed to said lever, and a cup extending in an inward direction from said inside face and adapted to receive and surround one end of said rotatable member, said end of the rotatable member having a slot therein, said cup having at least one radially inwardly extending lug which engages said slot in the rotatable member to form a rotational interlock preventing relative rotational movement between said end cap and said rotatable member;
   b) a bearing cage surrounding an outer arcuate surface of said cup and axially confined by said radially inwardly extending flange on said frame and said inside face of said end cap; and
   c) at least one lug member extending axially toward said reel from said cup, said lug also extending radially inwardly within said cup, a fastener securing said end cap to said rotatable member, and a retaining member having a roller, said retaining member being mounted on said lug and said roller being adapted to engage said radially inwardly extending flange on said face opposite said bearing confining face.

20. The swimming pool cover reel of claim 19, wherein the retaining member comprises said roller rotatably engaged by said fastener, said fastener comprising a headed screw where said roller is disposed, said screw passing through said lug into said rotatable member.

* * * * *